Inventor
John Caldwell Robins
By B. Singer
Atty.

Patented July 29, 1924.

1,503,379

UNITED STATES PATENT OFFICE.

JOHN CALDWELL ROBINS, OF BIRMINGHAM, ENGLAND.

APPARATUS FOR MIXING, GRINDING, REFINING, OR TREATING LIQUID MATERIAL, SUCH AS LIQUID CHOCOLATE.

Application filed March 20, 1923. Serial No. 626,334.

*To all whom it may concern:*

Be it known that I, JOHN CALDWELL ROBINS, a subject of the Kingdom of Great Britain, residing at 379 Stratford Road, Sparkhill, Birmingham, in the county of Warwick, England, have invented a certain new or improved Apparatus for Mixing, Grinding, Refining, or Treating Liquid Material, Such as Liquid Chocolate, of which the following is a specification.

This invention comprises apparatus for mixing, grinding, refining, or treating liquid material, such as liquid chocolate.

In the manufacture of chocolate, the quality of the product depends upon the thoroughness with which the cream is infused into the chocolate substance, and also upon the fineness to which the chocolate ingredient is ground. It is the object of the present invention more effectively to admix the ingredient, also more effectively to grind the chocolate ingredient in the process of admixing, and with this object in view the present invention comprehends apparatus for mixing, grinding, refining or treating liquid material, such as liquid chocolate, involving a receptacle in which the liquid chocolate or other material is contained, and in which a plurality of oscillatory beating devices capable of individual movement are located side by side and adapted successively to descend upon the contents. In conjunction with the beaters provision is advantageously incorporated to grind the material at the internal surface of the receptacle.

In order that this invention may be clearly understood and readily carried into practice, reference may be had to the appended explanatory two sheets of drawings, upon which:—

In a convenient embodiment of the present invention, I provide a receptacle $a$ composed of or lined with metal, and adapted to contain the liquid to be treated. The internal metal surface is adapted to form a grinding surface. A suitable outlet $x$ is provided at the bottom for the egress of the treated material, and the receptacle is open at the top for the egress of the material to be treated, for which purpose the gear mechanism hereinafter described is mounted upon arched or appropriately shaped transverse supporting members $z$ $z$.

Located within the receptacle $a$ are two plates $b$, $b$, each adapted to maintain a horizontal position and to move vertically in the receptacle. For this purpose, at each end of the receptacle guides $c$ are provided, and the plates $b$ are at their ends furnished with channel-shaped runners $d$ adapted to maintain the horizontal position of the plates $b$ during their vertical movement.

Figure 1:
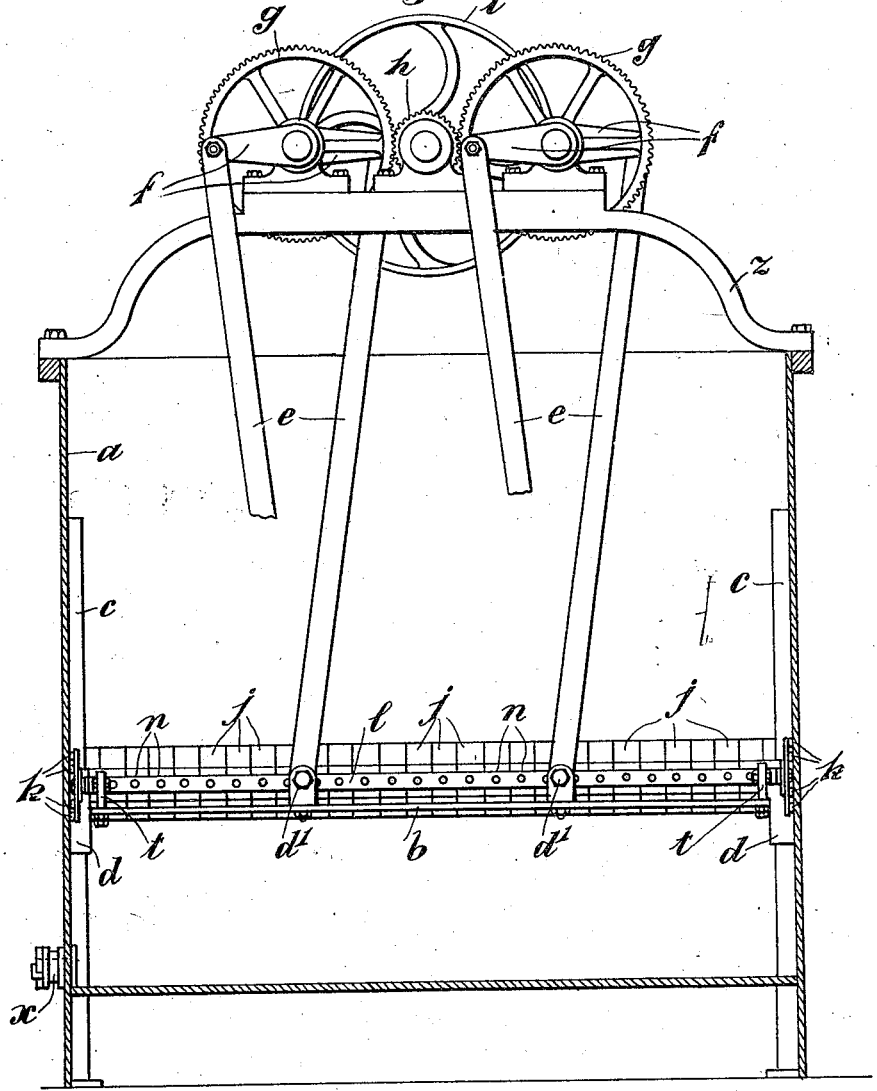
Figure 1 is a sectional elevation of an apparatus according to the present invention.
Figure 2:
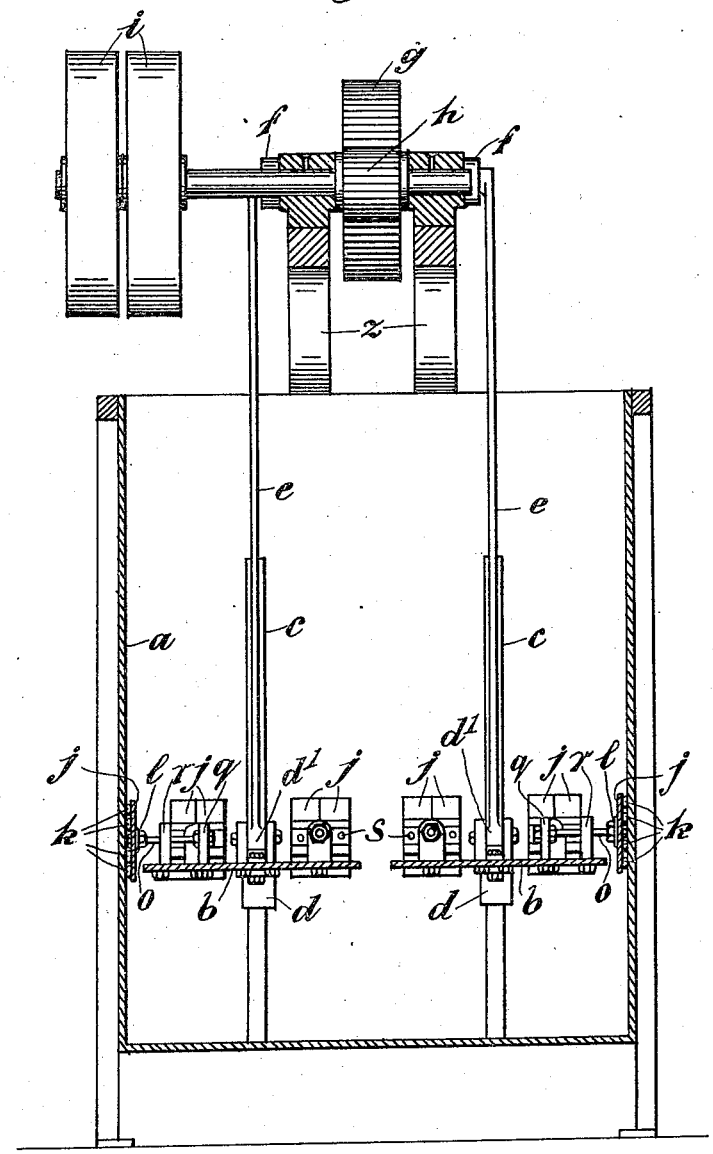
Figure 2 is a sectional elevation of the apparatus shown in Figure 1.

Each plate is articulated at $d^1$, $d^1$ to rods $e$ which at their upper extremities are articulated to crank arms $f$, $f$ rotated by spur wheels $g$, $g$ meshing with a common driving spur wheel $h$ driven by fast and loose belt pulleys $i$ from any suitable source of power. The cranks $f$ and connecting rods $e$ are repeated on the other side of the gears $g$, and $h$ as shown in Figure 2 to provide for the operation of both of the plates $b$, the cranks $f$ on one side of the gear being at an angle of 180° to those on the other side of the gear, so that as one plate $b$ descends, the other ascends, and vice versa.

When, therefore, the machine is in operation, the descent of one plate throws a volume of the liquid across the receptacle to fill the space underneath the other ascending plate. Meantime, this other ascending plate raises a volume of the material upon its upper surface, which volume of material flows in the form of a wave in a reverse direction onto the top of the descending plate. There is, therefore, an intermittent backward and forward flow of the material, and by this action a sponge characteristic is imparted to the material.

If desired, the plates *b, b* may be perforated or in the nature of grids or equivalent devices.

Any suitable gear may obviously be provided between the driving mechanism and the provision for oscillating the plates *b, b*.

The provision for oscillating the plates *b, b* may obviously be modified considerably.

Around the one side and across the ends of each plate, provision is incorporated which is in rubbing contact with the internal surface of the receptacle for the purpose of grinding the solid constituent of the contents in relation to the internal surface of the receptacle. Between the plates themselves and the sides and ends of the receptacle, a marginal space is left, and a marginal space is also left between the two adjacent sides of the plates. This permits of a flow of the material through these marginal spaces in the action of the machine, and additionally ensures that the material is brought effectually and consistently to the surfaces of the receptacle at which it is subjected to the grinding process.

Figures 4, 5, 6:
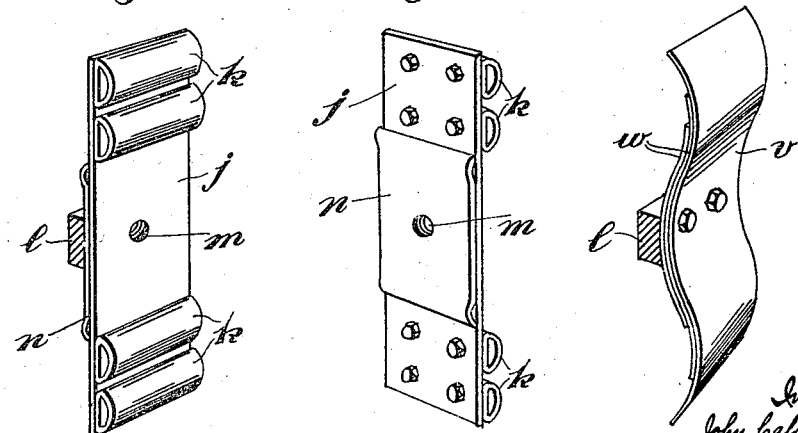
Figure 4 illustrates one of the grinding devices.
Figure 5 is another view of the grinding device shown in Figure 4.
Figure 6 illustrates a modified grinding device.

For effecting the grinding process, I provide a series of grinders of the character shown in Figures 4 and 5. Each of these may comprise a plate *j*, to the surface of which semi-circular tubular grinding members *k, k* are fastened in any appropriate manner. A number of these plates *j* are bolted to a longitudinal bar *l* by bolts passing through perforations *m*. The plate *j* is of a springy character so that the rubbers *k* are pressed against the internal surface of the receptacle under this spring effort, and the said spring effort may be augmented by the utilization of an additional spring *n* located between the plate *j* and the bar *l*.

The grinding members *k, k* may be solid instead of tubular, and more or less of these grinding members may be provided upon each plate *j*.

The bar *l* is carried by two or any suitable number of supporting rods *o* which are appropriately secured to the plate *b*, and adjustment provision is provided in connection with these bars *o* whereby bars *l* of rubbers carried thereby may thereby be adjusted in relation to the surface upon which they operate. For this purpose the rods *o* may be screw threaded and fitted with nuts *p* located one on each side of a perforated projection *q* upon the plate through which the rod *l* passes, the rod *o* passing also through another perforated projection *r* upon the plate.

Figure 3:
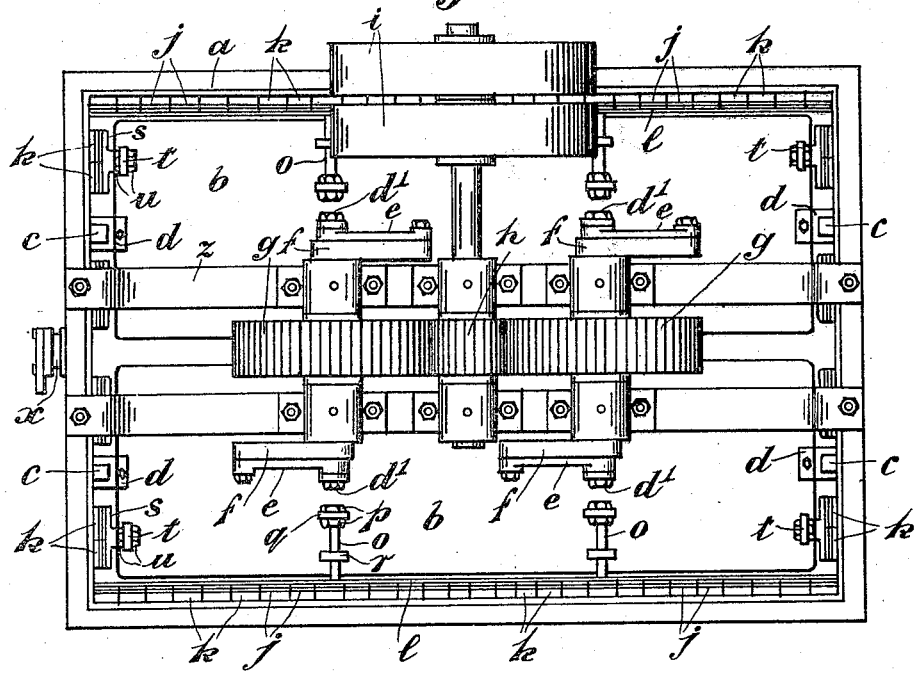
Figure 3 is a plan of the apparatus shown in Figures 1 and 2.

Grinding devices are also provided at the ends of the plates *b*. As shown in Figure 3, two of the devices shown in Figures 4 and 5 may be provided on each side of the guiding provision. Each pair of elements *j* may be secured to a carrier *s* having a stem passing through a perforated projection *t* upon the plate *b* and secured by adjusting nuts *u* in a manner permitting of adjustment similar to that described in connection with the rods *o*.

Figure 6 illustrates a modified form of grinding device in which the plate *v* is shaped as shown with two convexities to enable it itself to fulfill the grinding function. The plate *v* which itself is of a springy character may be reinforced by an additional spring plate or plates *w*.

What I claim as my invention and desire to secure by Letters Patent is:—

1. Apparatus for mixing, grinding, refining or treating liquid or semiliquid material such as liquid chocolate, comprising a receptacle, a pair of horizontal beater plates located side by side within the receptacle, means for imparting a simultaneous and opposite vertical reciprocating movement to said beater plates, means provided upon said beater plates for grinding the solid ingredient of the material by rubbing contact with the walls of the receptacle, and a series of grinder plates secured along one side and across both ends of each beater plate, each grinder plate being of a flexible character.

2. Apparatus for mixing, grinding, refining or treating liquid or semiliquid material such as liquid chocolate, comprising a receptacle, a pair of horizontal beater plates located side by side within the receptacle, means for imparting a simultaneous and opposite vertical reciprocating movement to said beater plates, means provided upon said beater plates for grinding the solid ingredient of the material by rubbing contact with the walls of the receptacle, and a series of grinder plates secured along one side and across both ends of each beater plate, each grinding plate being of a flexible character, and comprising a plurality of grinding members of semicylindrical tubular form.

3. Apparatus for mixing, grinding, refining or treating liquid or semiliquid material such as liquid chocolate, comprising a receptacle, a pair of horizontal beater plates located side by side within the receptacle, means for imparting a simultaneous and opposite vertical reciprocating movement to said beater plates, means provided upon said beater plates for grinding the solid ingredient of the material by rubbing contact with the walls of the receptacle, and a series of grinder plates secured along one side and across both ends of each beater plate, each grinding plate being of a flexible character, each beater plate having an adjustably mounted carrier, and said grinder plates being arranged on said carrier.

4. Apparatus as claimed in claim 1, and wherein each horizontal beater plate is movable on vertical end guides provided within the walls of the receptacle.

5. Apparatus of the class described comprising a receptacle having a straight wall, a beater plate arranged for reciprocating motion in said receptacle at right angles to said wall, means to impart such motion to said beater plate, and a grinder plate arranged on one side of the beater plate parallel and coacting with said wall to grind material in said receptacle.

In witness whereof I have hereunto set my hand:

JOHN CALDWELL ROBINS.